United States Patent [19]

Livingstone

[11] Patent Number: 5,429,197
[45] Date of Patent: Jul. 4, 1995

[54] BLADE FOR A SOIL AGITATING DEVICE

[76] Inventor: David J. Livingstone, P.O. Box 435, Caringbah New South Wales 2229, Australia

[21] Appl. No.: 982,740
[22] PCT Filed: Aug. 5, 1991
[86] PCT No.: PCT/AU91/00344
§ 371 Date: Apr. 2, 1993
§ 102(e) Date: Apr. 2, 1993
[87] PCT Pub. No.: WO92/02119
PCT Pub. Date: Feb. 20, 1992

[30] Foreign Application Priority Data

Aug. 3, 1990 [AU] Australia .................. PK1580

[51] Int. Cl.⁶ .................................. A01B 45/02
[52] U.S. Cl. ........................ 172/699; 172/721; 172/766; 172/771
[58] Field of Search .............. 172/765, 770, 771, 766, 172/769, 768, 700, 721, 699; 30/356, 357, 379

[56] References Cited

U.S. PATENT DOCUMENTS

| 539,755 | 5/1895 | Dow | 172/765 X |
| 612,901 | 10/1898 | Hoke et al. | 172/765 X |
| 670,160 | 3/1901 | Oeder | 172/770 X |
| 819,390 | 5/1906 | Warren | 172/763 X |
| 850,011 | 4/1907 | Jobson | 172/770 |
| 1,623,488 | 4/1927 | Morberg | 172/768 |
| 2,596,769 | 5/1952 | Giedd | 172/771 X |
| 3,063,505 | 11/1962 | Nelson | 172/771 X |
| 4,506,739 | 3/1985 | Mascaro . | |

FOREIGN PATENT DOCUMENTS

| 2492621 | 4/1982 | France . | |
| 895389 | 9/1953 | Germany | 172/766 |
| 952573 | 10/1956 | Germany | 172/700 |
| 1782037 | 1/1972 | Germany . | |
| 1013858 | 12/1965 | United Kingdom | 172/700 |
| 2031252 | 4/1980 | United Kingdom | 172/700 |
| 1596657 | 8/1981 | United Kingdom . | |
| 1136755 | 1/1985 | U.S.S.R. | 172/765 |
| 1386055 | 4/1988 | U.S.S.R. | 172/700 |
| WO87/04893 | 8/1987 | WIPO . | |

*Primary Examiner*—Randolph A. Reese
*Assistant Examiner*—Christopher J. Novosad
*Attorney, Agent, or Firm*—Morrison & Foerster

[57] ABSTRACT

The present invention relates to soil agitation, and in particular to machines which are used to dig decompacted soil and agitate the turf on sporting greens, such as golf greens and football fields. The present invention in particular presents a new type of blade for the soil agitation device, the blade being mountable to a soil agitation device and having a leading cutting edge which presents a shallow angle of attack to the soil. The leading edge slopes away from the top part of the blade at an angle to the horizontal which is preferably in between 15°–35°. The blade preferably mounts "bullets", protruberances from the side of the blade, which assist in decompaction of the soil. These bullets are mounted in between the top and bottom of the blade, which is different from the prior art blades, which are mountable to the bottom of the blade.

8 Claims, 7 Drawing Sheets

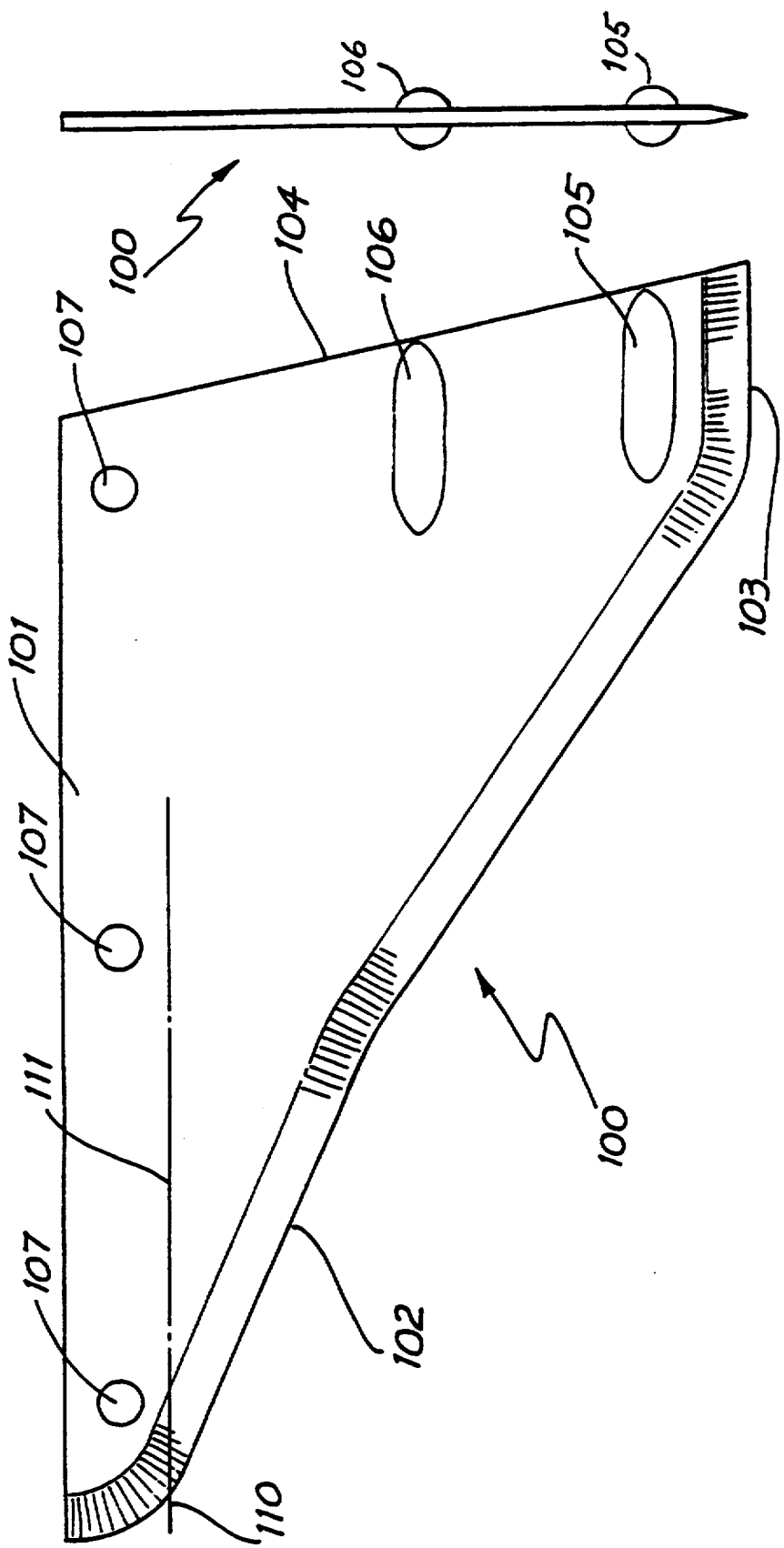

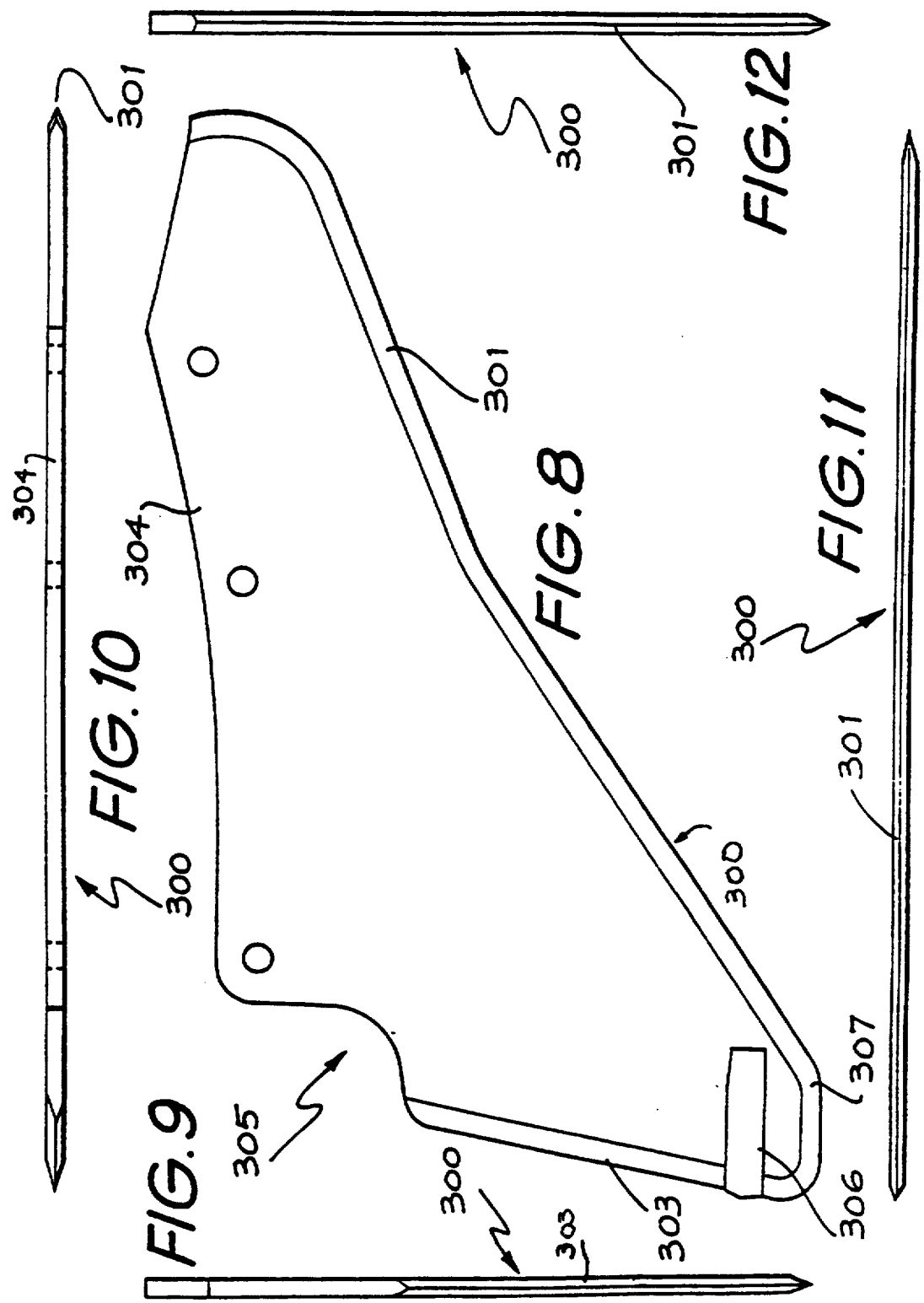

BLADE FOR A SOIL AGITATING DEVICE

The present invention relates generally to soil care, and particularly to a blade for use with a soil agitating device, and a soil agitating device.

Soil agitation devices are known and are intended to be used primarily in caring for turfed areas, such as the greens and fairways on golf courses, for example, although they may be used in other more general agricultural applications.

In order to provide adequate soil drainage characteristics in surface soil and to improve root penetration for the turf it is known in the prior art to agitate the surface soil by cutting a series of parallel channels therein using a device which mounts a plurality of adjacent cutting blades arranged to oscillate as the device is dragged along the surface. The blades act to cut channels in the soil as the device is moved along, as well as acting to break up soil compaction due to vibration of the blades. The blades are often provided with enlarged, generally cylindrical, bodies at the blade-end deepest in the soil. These bodies are known as "bullets" or "torpedoes" and act to produce a wider channel at the full depth of the blade, which improves soil drainage characteristics.

In one prior art machine, the plurality of blades are mounted adjacent to each other and spaced apart by the distance required for the width of the parallel channels in the soil. A cylindrical bearing, driven by drive means about an axis offset from the central axis of the cylinder is arranged to transfer its eccentric motion to the blades via an elongate beam to cause the blades to move forwards and backwards in a rapidly oscillating manner as the machine is moved along the soil surface.

In another prior art machine an eccentric weight is mounted on the machine and is caused to rotate by drive means, the motion causing the whole machine to vibrate and thus causing the blades to resonate as they are pulled through the soil.

Motion of the parallel blades, whether forward and backward vibration, as in the first prior art example, or by resonation, as in the second prior art example, enables the blades to be pulled through the soil with less effort than if they were stationary relative to the machine and causes some decompaction of the soil adjacent to the blades.

A further prior art machine drives the blades to move in an out of phase manner. Each blade is separately driven by an associated cylindrical bearing which is mounted eccentrically. Each cylindrical bearing is offset in its rotary action with respect to each other cylindrical bearing, so that each respective blade is impelled forwards at a different time. This "staggered" motion of the blades results in a reduction of shock vibration of the mounting frame. However, this machine and the prior art machines discussed above tend to tear any turf or crop rather than cutting cleanly through it. This is undesirable, particularly where the machine is being used to care for greens and sports fields.

From one aspect, the present invention provides a device for agitating soil, comprising a frame arranged to be towed or self-propelled and mounting at least one cutting blade arranged to penetrate the soil and cut a channel therein as the frame moves along, the blade being mounted for reciprocating motion relative to the frame along a line coincident with the direction of cutting, and means for reciprocating the blade, comprising a cam and cam follower arrangement.

The cam may be cut to provide an uneven or jerking forward motion, the particular cam profile being selected to suit the circumstances in which the machine is used.

Thus, there are a number of soil agitation devices which are available to provide decompaction and aeration of soil, including the prior art devices and the device of the first aspect of the present invention.

Previously, such devices have utilized as the cutting blade a flat blade-member with a sharp leading edge and "bullet" at the blade end arranged to be deepest in the soil. The blade is mounted such that, in operation, the leading edge of the blade extends almost vertically downwards into the soil, with only a slight backwards slope away from the direction of cutting. The slope is more pronounced towards the top of the blade, curving towards the vertical as it approaches the bottom of the blade. Such a prior art blade is illustrated in side view in FIG. 1.

Referring to FIG. 1, the blade 200 comprises a blade-member having a sharp leading edge 201, a blunt trailing edge 202, a bullet 203 at the bottom end of the blade and holes 204 for allowing mounting of the blade to a soil agitation device. The blade 200 is substantially flat, apart from the bullet 203 which is generally cylindrical. The bullet 203 has a hook 205 which extends in front of the leading edge of the blade 200. It is known to have a point extending form the bullet, the point being on the centre line of the cylinder as an alternative to the hook 205. The leading edge 201 of the blade 200 extends almost vertically downwards towards the bottom of the blade, with a slight backward slope, being more pronounced at the top of the leading edge 201.

In operation, the blade 200 is mounted on a soil agitation device and is arranged to move through soil, leading edge 201 first, by vibration (depending on the type of agitation device being used). In moving through the soil the bullet 203 acts to "shatter" surrounding soil and provide drainage channels therethrough. The blade 200 assists in this.

We have found that a number of significant problems occur due to the use of this prior art form of blade.

Firstly, in order for the blade to enter the soil it has been found necessary that the agitation device must be travelling forward at the time, because of the large dimension bullet at the bottom of the blade. Even when the machine is travelling forward as the blade enters, the bullet will cause significant surface disruption. This surface disruption is obviously undesirable, particularly for applications relating to sporting turf, such as golfing greens, for example.

Secondly, disruption also occurs when the blade is removed from the soil at the end of the machine run. The wide, hooked bullet being pulled through the top soil in the path of the blade causes tearing. This makes it quite difficult to pull the blade from the soil and impossible to do so without causing surface disturbance. Reversing of the agitating device is in fact necessary to remove the blades from the soil, and significant surface disruption is still caused.

Thirdly, where obstructions occur in the surface soil as the machine is being worked, for example stumps or stones in the path of the blade, the hooked bullet will tend to get caught on the obstruction causing deformation of the blade and/or interruption of the agitating device. For example, where the blade is obstructed by a stone, the bullet will either be hooked under the stone and/or twisted to one side. As soon as the blade is twisted to one side it will tend to follow the twisted path resulting in increased damage of the blade and undesirable disruption of the soil. Even after the obstruction has been passed the blade will tend to maintain its deformed path as it is continually being pulled through the soil even when twisted. Another problem which could occur in this respect is that the bullet could hook onto the obstruction and try and drag it through the soil, creating a great deal of disruption.

Further, with this blade it is necessary to provide, mounted on the agitating machine and preceding the blade, a cutting disc, the function of which is to cut the surface turf in front of the agitating blade, in order to allow ease of movement of the agitating blade. The requirement for the preceding cutting blade increase the complexity of the agitating device. Further, an agitating device usually has several blades, usually six or more, and requires the same number of preceding cutting discs. In order for the discs to penetrate surface turf to the desired depth the machine must be heavy. Further, where the ground is hard, the cutting discs will not penetrate to the desired depth and will cause the agitating blades to be raised above their desired depth, leading to inadequate agitation of the surface soil.

There is therefore a need for a blade which does not give rise to these problems.

The present invention provides a soil agitation blade arranged for mounting on a soil agitation device, the soil agitation blade comprising a leading cutting edge for cutting a channel through soil and turf in operation, the leading cutting edge sloping downwards and backwards with resopect to an imaginary line which commences at a point proximate a top part of the blade where the slope of the leading edge starts, and extends backwards in a horizontal direction in operation of the blade, substantially parallel to the surface of the soil turf, the angle betwene the leading edge and horizontal line being a small one whereby to provide shallow angle of attack into the soil.

The angle with respect to the horizontal is preferably less than 45°, preferably in the range of 15° to 35°, and preferably 23°.

The shallow "angle of attack" maximizes blade length relative to blade depth into the soil and has the advantage of resulting in less resistance to movement therethrough. It provides a "mechanical advantage", rather akin to a knife on a chopping board. Further, as the blade moves through the soil it tends to push any turf roots downwards, making a smooth cut without tearing any turf.

"Bullets" are preferably provided on the blade, as discussed below.

The present invention further provides a soil agitation blade arranged for mounting on a soil agitation device, the blade comprising a leading edge, a trailing edge, a top edge and a bottom, the blade being provided with a bullet mounted in between the top edge and bottom.

The bullet or bullets preferably do not extend in front of the blade.

The blade may also have a bottom edge, which is preferably sharpened for ease of entry to the soil, or the trailing and leading edges may meet in a sharpened point or curve.

There may be more than one bullet, for example there may be two bullets mounted between the top and the bottom of the blade. Preferably, the bullets are mounted towards the rear edge of the blade and do not extend forwards of the leading edge of the blade.

Having the bullet or bullets mounted away from the bottom of the blade allows for ease of entry to the soil. The bottom of the blade is preferably sharpened, as is the leading edge and trailing edge.

The leading edge is preferably arranged to be at a shallow angle with respect to the horizontal as described above in relation to the first aspect of the invention.

Preferably, the blade in accordance with both above aspects of the invention is shaped similarly to the wing of a "delta wing" aircraft. That is, it has a shallow angle leading edge which sweeps back to a slightly angled trailing edge. This shape allows for ease of movement through the soil.

We have found that this blade is much more efficient than the prior art blade in agitating soil.

The blade of the present invention has the advantage that it can be eased directly into the soil without having to move the agitating device forward as in the prior art blade. Further, any disruption of the surface turf is minimal because of the sharp bottom of the blade and the fact that the bullets are placed away from the bottom edge and do not extend forward of the blade.

Further, the blade in accordance with both aspects of the present invention has a "stump jumping" type operation. That is, if it reaches an obstruction in its path it will tend merely to lift over the obstruction by virtue of its swept back shape and the fact that there is no hook or point to catch on the obstruction. The blade therefore moves very smoothly through the soil.

The blade has a further advantage that it can even be moved in the reverse direction as well as the forward direction (this assists in the turning of corners, for example) and lifts easily out of the soil causing minimum disruption, without requiring reversal of the agitating deviceFurther, with the present invention, cutting discs preceding the agitating blades can be dispensed with. This means that one can have a lighter machine, and there is no problem with preceding cutting discs holding the agitating blades out of the soil. Cutting discs the machine from reaching full depth of the cutting blades, and the cutting discs are only really effective when full depth is reached. In particularly hard soil the discs will penetrate hardly at all and act to hold the blades far above their effective depth. The ability to do without these discs is therefore a substantial advantage.

Features and advantages of the present invention will become apparent from the following description of an embodiment thereof, by way of example only, with reference to the accompanying drawings, in which;

FIG. 6 is a schematic side view of an embodiment of the soil agitating blade in accordance with the present invention, and FIG. 7 is a rear view of the blade of FIG. 6.

FIG. 8 is a side view of a further referred embodiment of a soil agitating blade in accordance with the present invention;

FIG. 9 is a rear view of the blade of FIG. 8;

FIG. 10 is a top view of the blade of FIG. 8;

FIG. 11 is a bottom view of the blade of FIG. 8; and

FIG. 12 is a front view of the blade of FIG. 8.

Figure 1:
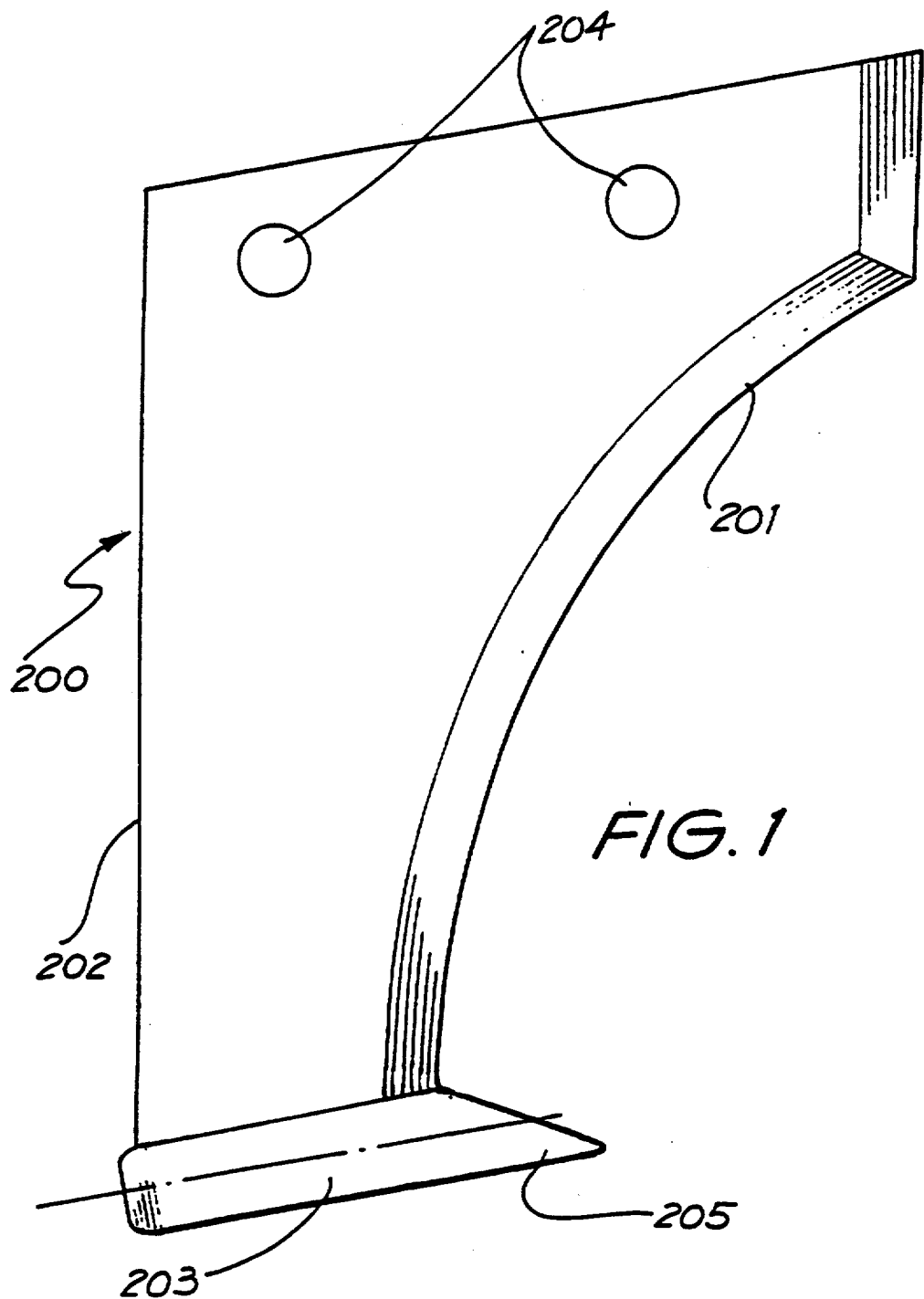
FIG. 1 shows a side view of a soil agitating blade in accordance with the prior art.

With reference to FIGS. 2 to 5, a soil agitating device in accordance with an embodiment of the invention will be described, utilising a standard prior art blade arrangement.

The device, generally designated by reference numeral 1, comprises a frame 2 which mounts a plurality of reciprocal cutting blades 3 which are arranged to penetrate the soil as the device 1 is moved along the ground, causing decompaction of the soil by virtue of their reciprocating action and also acting to cut drainage channels in the soil. The reciprocating blades 3 are driven by drive means 4 via a cam shaft 5 which mounts a plurality of cams 6, one for each cutting blade 3. Each cam 6 acts to reciprocate its respective blade 3 in a fashion according to the cam profile.

The cams 6 are fixedly mounted on the cam shaft 5 in a manner such that they are "staggered" with respect to each other, so that as the cam shaft 5 rotates at least some of the blades 3 will be reciprocated in a manner which is not in phase with other blades 3 i.e. if a "still picture" of the reciprocating blades 3 was taken at any time, the blades would not be parallel to each other but will be at different positions in their respective reciprocating actions. In this particular embodiment each cam is staggered some 60° to each adjacent cam. This leads to a reciprocating action for the blades 3 such that the minimum number of blades 3 are travelling forward with respect to the frame 2 at the same time. This means that a minimum of vibration is transmitted to the frame 2, and the blades 3 move through the soil in a more efficient manner.

Figure 2:
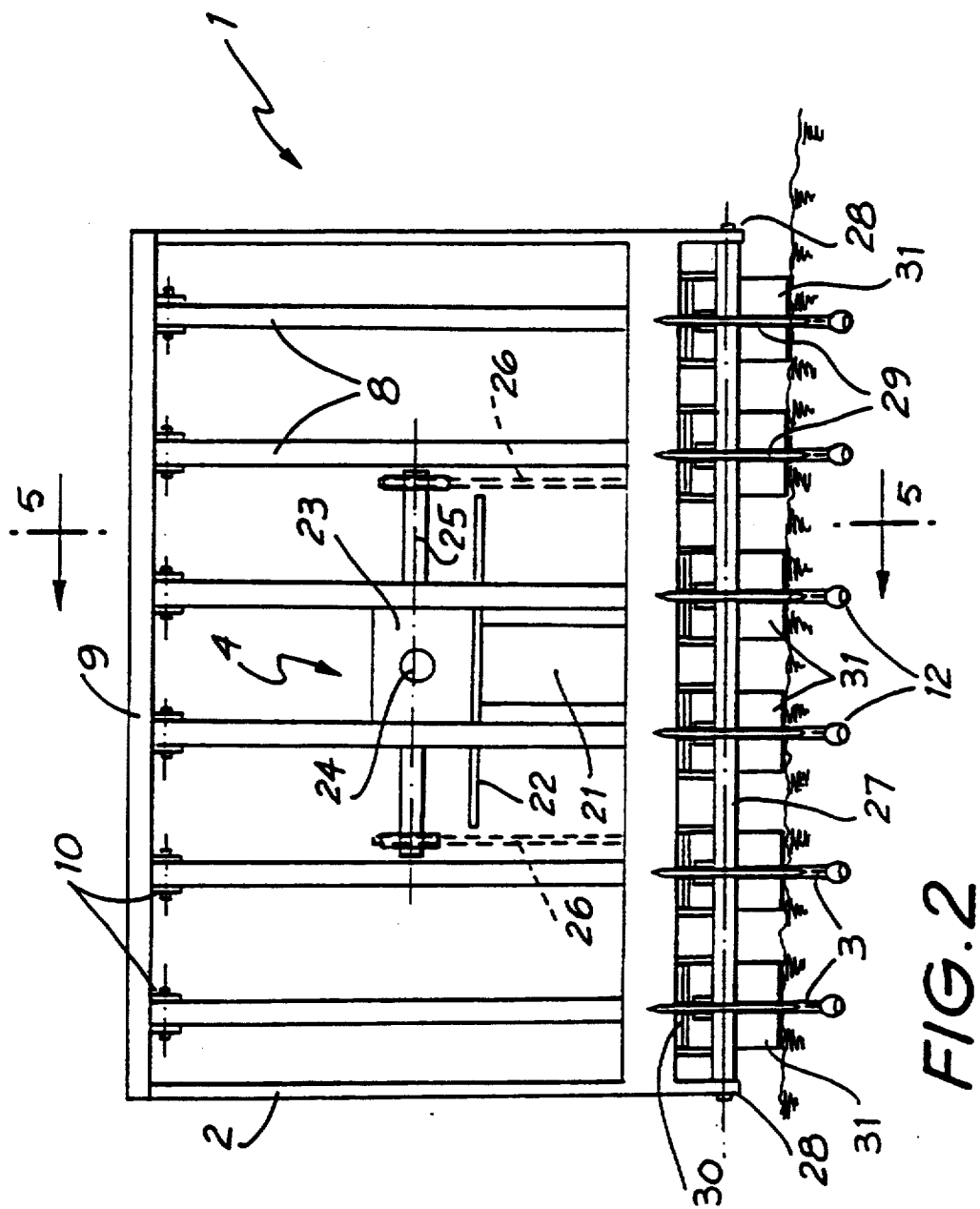
FIG. 2 is a schematic front on view of a surface soil agitating device in accordance with an embodiment of the first aspect of the present invention.
Figure 3:
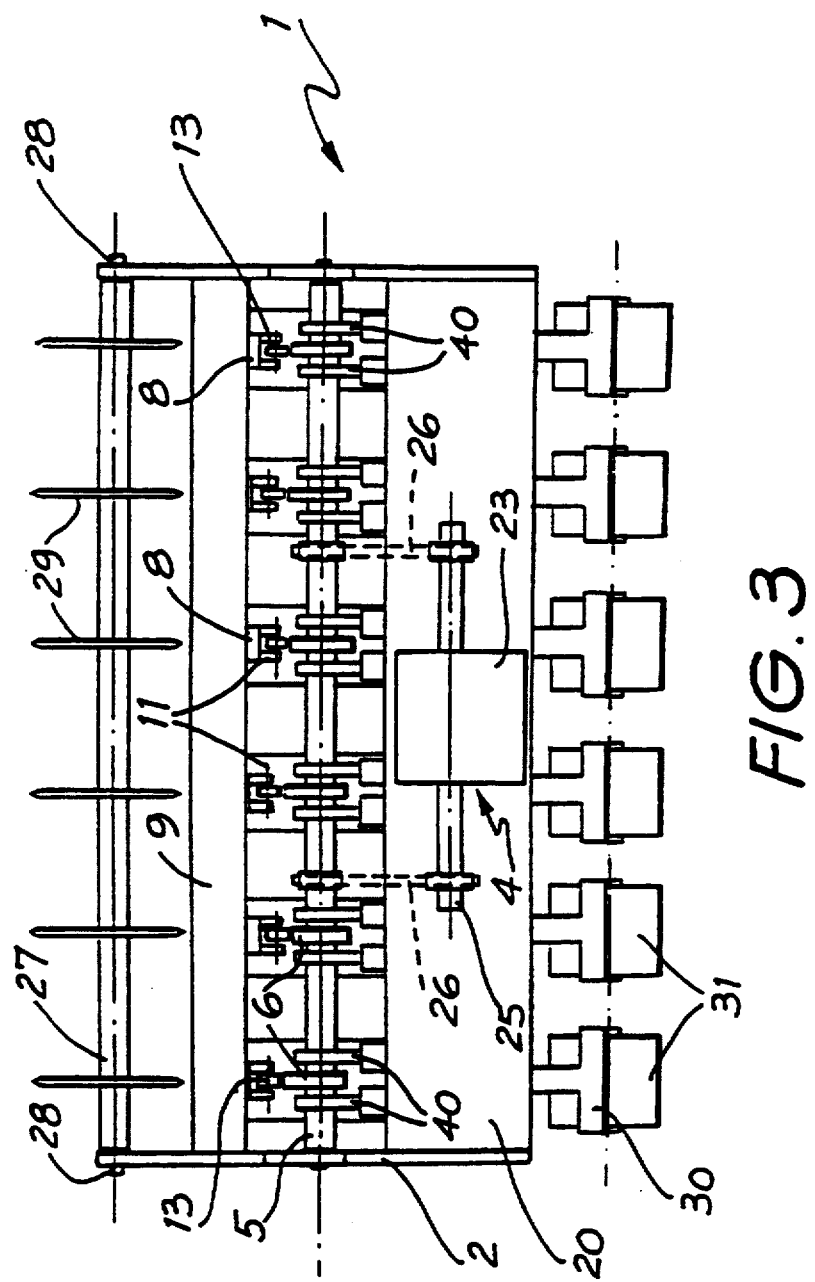
FIG. 3 is a schematic top plan view of the agitating device of FIG. 2.
Figure 4:
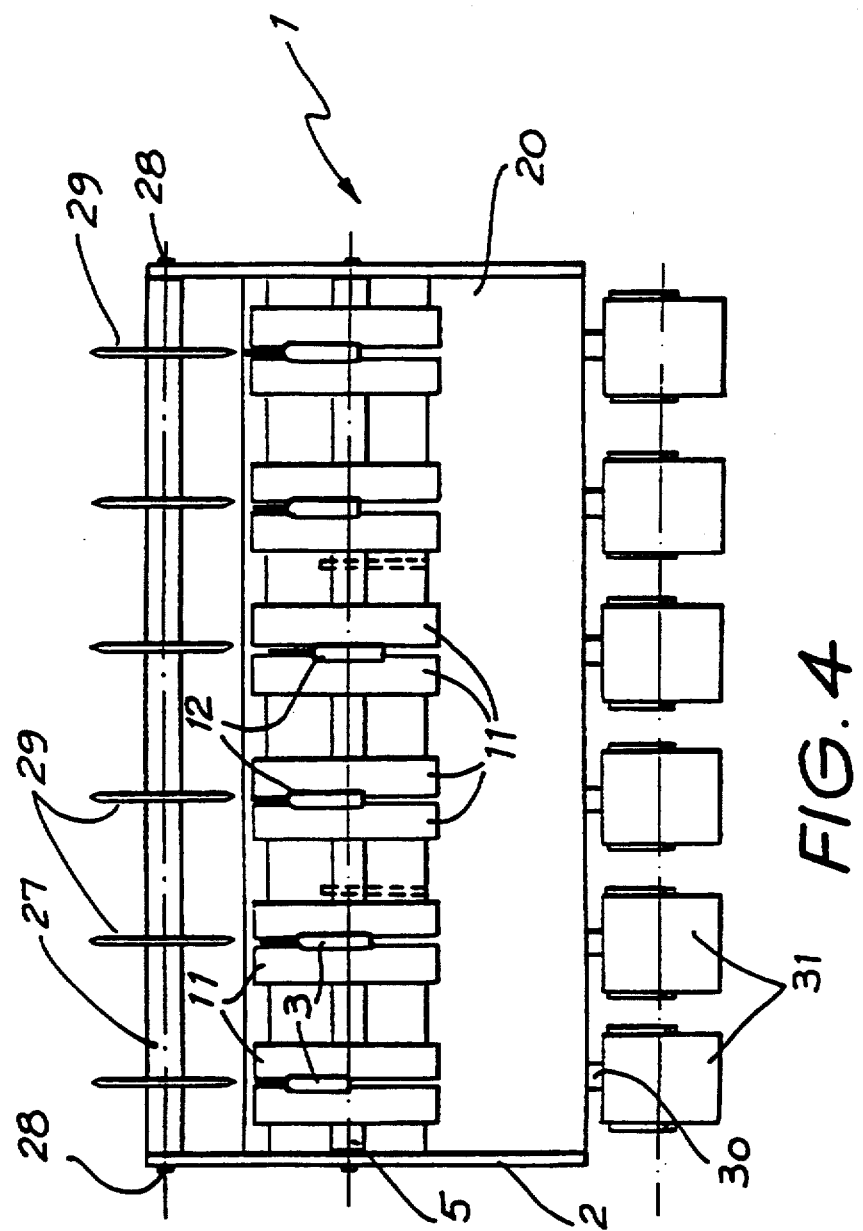
FIG. 4 is a schematic bottom plan view of the agitating device of FIG. 2.
Figure 5:
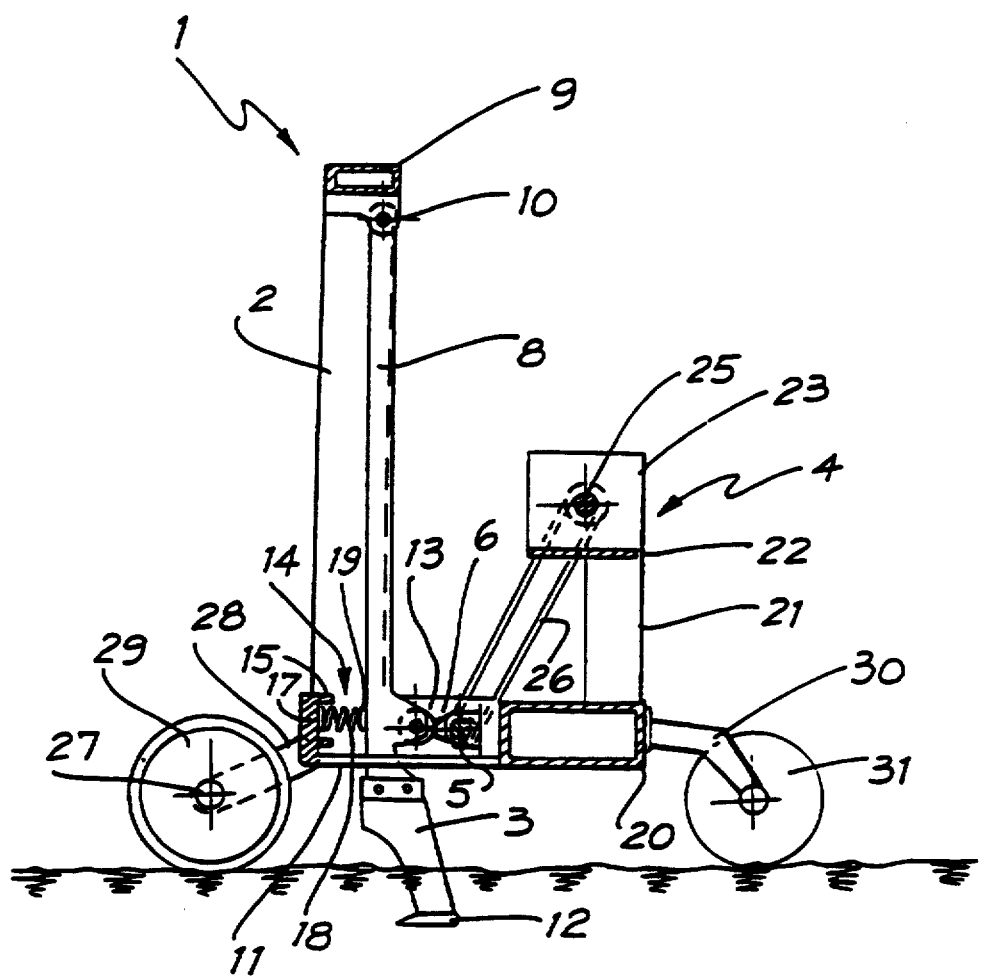
FIG. 5 is a side cross sectional view of the agitating device along line xx of FIG. 2.

In more detail, referring to FIGS. 2 through 4, the frame 2 mounts six con rods 8, from a transverse bar 9 running across the top of the frame 2. The con rods 8 are each pivotably mounted at pivot points 10 to allow for reciprocating motion. The con rods 8 are also relatively long so that reciprocating motion about the pivot point 10 results in relatively little vertical motion of the end of the con rod 8 remote from the pivot point 10. The remote end of each con rod 8 is generally of flattened "blade-like" form and extends through a gap between adjacent guide plates 11. The guide plates 11 act to stabilize the remote end of each con rod 8 so that no lateral motion is allowed outside the plane of the reciprocating motion. A cutting blade 3 is attached to the flat end of each con rod 8 below the guide plates 11. Each cutting blade 3 has a sharp forward edge and can be provided with a bullet 12 at its lower extremity for cutting drainage channels in the soil, as is standard for prior art type blade arrangements.

Integral with each con rod 8, at a point just above the guide plates 11 is a mounting for a cam follower 13. Each respective cam follower 13 is arranged to abut and rotate with a respective cam 6, thus translating the rotational motion of the uneven cam surface into reciprocating motion of the con rod 8. A biassing means, in the form of a captive spring arrangement 14, biases each con rod 8 towards the cams 6 at all times, to maintain the cam followers 13 and cams 6 in contact.

The captive spring arrangement 14 comprises a socket 15 integral with a forward plate 17 of the frame 2, which houses a compression spring 17. The compression spring 17 extends beyond the socket 15 and embraces a projection 18 integral with the con rod 8 and on the opposite side to the cam follower 13 mounting.

A rear transverse beam 20, of the frame 2, which is here shown to be a hollow beam, supports a gear box mounting 21, 22 which mounts a gear box 23. The gear box 23 has a socket 24 for an input shaft to be provided for a towing vehicle. It also has an output shaft 25 running transverse to the gear box and the frame. When the gear box 23 is connected to the drive means of a towing vehicle (not shown) via the input shaft socket 24 power can be transmitted to turn the output shaft 25.

Drive chains 26 are mounted on the output shaft 25 at either side of the gear box and act to transmit rotation of the output shaft 25 to the cam shaft 5 in order to rotate the cams 6 when the device 1 is in operation.

The cam shaft is mounted in bearings 40, which are integral with the rear transverse beam 20.

At the forward end of the frame 2 a further shaft 27 is mounted on brackets 28 for free rotation as the frame 2 is moved along. Six disc blades 29 are mounted on the further shaft, each blade 29 being in line with each respective cutting blade 3. The disc blades 29 act as guides and stabilizers for the following reciprocating cutting blades 3, and precut any turf.

At the rear end of the frame 2 independently supported by brackets 30 which are pivotably attached to the rear transverse beam 20, are six rollers 31, which are biassed downwards, each aligned with a respective cutting blade 3, for smoothing down the turf or soil following agitation by the device.

The device 1 may have wheels mounted at either side thereof to facilitate motion over the ground. These are not shown. The frame 2 may also be covered by a cowling (not shown).

In operation, the device 1 will be towed by a tractor or other towing vehicle (not shown), with a drive connected from the towing vehicle to the device gear box.

The cams 6 have a "positive-rise" profile, so that each cutting blade 3 is driven forward by a cam slower than it is allowed to go backward, giving a mechanical advantage to forward motion of the blade. The cams 6 also have two lobes 42, 43 so that two reciprocations of each blade 3 occur for one rotation of the cam shaft 5.

The above description of a soil agitation device as in relation to a standard type blade, such as the type illustrated in FIG. 1. Using such a blade gives rise to all the problems discussed in the preamble of this specification.

This blade can be replaced by the type of blade illustrated in FIG. 6, which is in accordance with an embodiment of the present invention.

With reference to FIG. 6, reference numeral 100 designates generally a blade in accordance with an embodiment of the present invention. In side view, the blade 100 has a shape very similar to that of a delta wing of a delta wing aircraft. We have found that this shape promotes ease of movement through the soil.

Further, this blade 100 presents a much greater surface area to the soil than the prior art blade, which results in more efficient agitation and decompactor of the surface soil. Unlike the prior art blade, the length dimension of the blade 100 is greater than its depth (into the soil dimension), so that the leading edge 102 slopes backwards at aa shallow angle with respect ot the horizontal (in operation of the device). The blade 100 is larger than the prior art blade, to give the greater blade area and improved soil decompaction.

Example dimensions of this blade are 480 mm in length to 300 mm in depth (height), as opposed to 180 mm in length to 280 mm in depth to the prior art blade. Dimensions may, of course, vary. Other embodiments have dimensions of 480 mm length, 380 mm depth, and 450 mm length, 240 mm depth.

The blade has a top edge 101, a leading edge 102, a bottom edge 103 and a trailing edge 104. A bullet 105 is mounted on the blade 100 a predetermined distance above the bottom edge 103. A further bullet 106 is mounted above the first bullet 105. Bullets 105, 106 may be moulded integrally with the blade 100, or may be welded.

The top edge 101 includes means 107 for mounting to an arm of a soil agitating device, such as the soil agitating device described above.

The leading edge 102 is arranged at a shallow angle to the top edge 101. The angle A in this case is 23°. As the blade 100 moves forward to "attack" the soil, the shallow angle of the sharp leading edge 102 gives a mechanical advantage to the attack, rather akin to knife on a chopping board. The blade thus cuts easily through the soil and any turf roots in the soil surface. Further, the action tends to force any turf roots downwards making a smooth cut without tearing the turf.

The "angle of attack" is taken from where the leading edge 102 starts sloping backwards, at point 110 on the drawing, and is taken between the leading edge 102 and an imaginary like 111 which coincides with the horizontal or surface of the soil which is being agitated, in operation of the device.

Unlike the prior art blade, the bullets 105, 106 on the new blade 100 do not extend forward of the blade. The blade thus presents a smooth leading edge to the soil and if any obstruction is reached the blade will tend to ride up and over the obstruction rather than being twisted out of shape and/or catching on the obstruction.

Because there is no bullet on the bottom edge of the blade there is no initial obstruction to the blade entering the turf as there is with prior art blades. The bottom edge 103 of the blade 100 is, in fact, sharpened. These features facilitate initial entry of the blade 100 into the soil. It tends to enter quite smoothly, even in a vertical direction. For similar reasons the blade tends to be easily lifted out of the turf Note that the bottom edge of the blade need not be a straight edge as such, but could be a point or curve formed between the leading edge and the trailing edge.

The trailing edge 104 of the blade is also sharpened and this blade can in fact move in a backwards manner through the soil, which facilitates manouverability of the soil agitating device. The sharp back facilitates the oscillating motion of the blade.

The bullets 105 are also sharpened to facilitate ease of motion of the blade 100.

Note, the bullets need not be generallt cylindrical as shown, but could be other shapes. A "winged" bullet can be utlized, which is flat and extended in the horizontal (in oepration) plane, to assist in stability of the blade.

Bullets may be dispensed with, and the blade utlized as is.

Preceding cutting discs, such as those described above in relation to the soil agitating device as standard blade, need not be used if this blade is used.

The blade need not be of the form as specifically described in relation to FIGS. 6 and 7.

In an alternative embodiment, the blade may comprise two components, a preceding blade component, whose primary function is to attack and cut a channel in the soil, and a following blade component, whose primary function is to break up soil compaction by vibration.

The preceding blade component has a leading edge with a shallow angle of attack, similarly to the leading edge of the blade described above, and the following blade component, which may be dimensionally thicker than the preceding blade component, carries the bullet or bullets.

The blade in accordance with the present invention may be used with any type of soil agitation device.

FIGS. 8 to 12 illustrate a further embodiment of a blade in accordance with the present invention. The blade 300 has a leading edge 301, angled with respect to an imaginary horizontal line 311, in the same way as the blade of FIGS. 6 and 7. It also has a bottom edge 302, a rear edge 303, and a top part 304. There are a number ofg advantageous differences between this blade and the blade of FIGS. 6 and 7.

A "notch" 305 is provided between the top 304 and rear 303 edges of the device. This "notch" 305 allows the surface turf or soil to close over the top of the rear part of the blade 303, as the device is in operation. The rear part of the blade is therefore still causing agitation of the soil underneath turf or top soil which is already closed over. This is in the closure of the turf, which means that less marks are left in the surface than with the other type of blade or the prior art blade.

Further, the top part 304 of the blade 300 is cuved, in a concave manner, to fit into a similarly curved mounting on an agitation device. This means that the blade rises upwards at the front as it oscillates, and prevents tearing of turf on undulating ground.

Bullets are not shown on this blade, but a gap 306 is shown where it could be placed.

It will be noted that in both this blade and the blade of FIGS. 6 and 7, the leading edge of the blade curves downwards as it goes towards the bottom of the blade. This is preventing the blade riding up in the soil where it is not necessary.

It will be recognized by persons skilled in the art that numerous variations and modifications mya be made to the invention as described above without departing from the spirit of scope of the invention as broadly described.

I claim:

1. A soil agitation blade arranged for mounting on a soil agitation device, the soil agitation blade comprising a flat vertical member having a leading cutting edge for cutting a channel through soil and turf in operation, the leading cutting edge sloping downwards and backwards with respect to an imaginary line which commences at a point proximate a top part of the blade where the slope of the leading edge starts, said imaginary line extending backwards in a horizontal direction in operation of the blade and substantially parallel to the surface of the soil turf, the angle between the leading edge and the imaginary line being less than 45° whereby to provide shallow angle of attack into the soil, the blade having a notch between a top portion and rear portion thereof, to allow surface soil or turf to close over the rear portion in operation.

2. A soil agitation blade in accordance with claim 1, wherein the angle is between 15° and 35°.

3. A soil agitation blade in accordance with claim 2, wherein the shallow angle is 23°.

4. A soil agitation blade in accordance with claim 1, having a sharp edged bottom edge to enable ease of entry in the soil.

5. A soil agitation blade in accordance with claim 1, wherein the blade has a bullet mounted between top and bottom edges of the blade.

6. A soil agitation blade in accordance with claim 5, wherein there are a plurality of bullets mounted between the top and bottom edges of the blade.

7. A soil agitation blade in accordance with claim 6, where there are two bullets.

8. A soil agitation blade in accordance with claim 1, which is shaped, looking at the blade from one side, like the "Delta" wing of an aircraft.

* * * * *